Feb. 20, 1951    J. H. OLIVER    2,542,699
ELECTRIC CHICK BROODER
Filed July 10, 1948
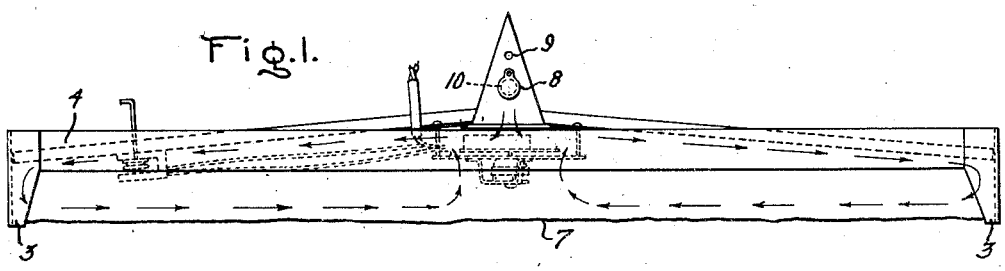
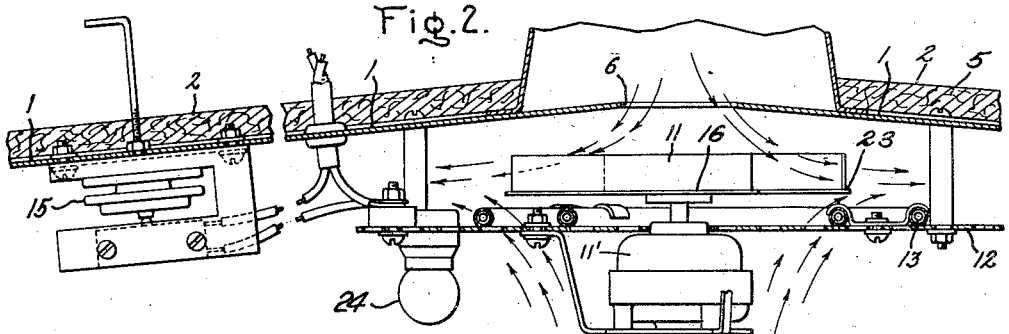
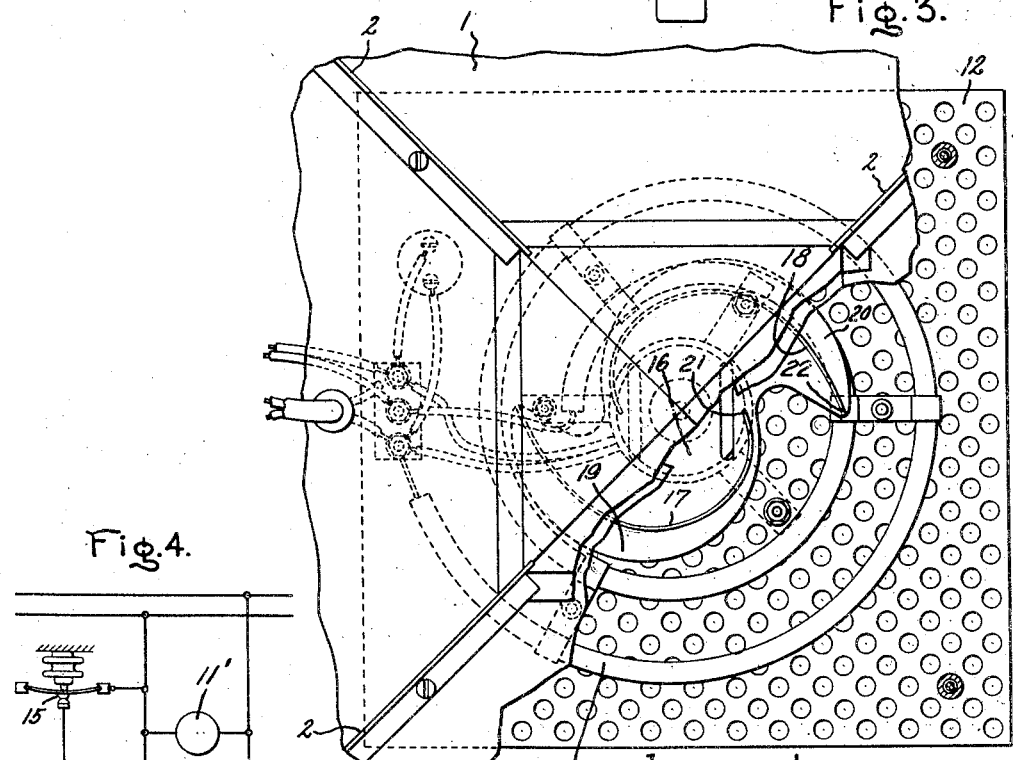
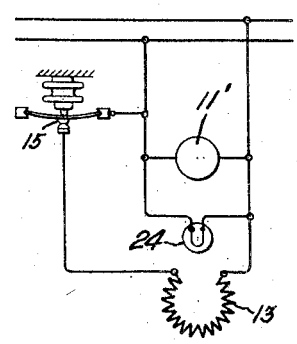
Inventor:
James H. Oliver,
by Claude J. Nott
His Attorney.

Patented Feb. 20, 1951

2,542,699

UNITED STATES PATENT OFFICE 2,542,699

ELECTRIC CHICK BROODER

James H. Oliver, Ballston Spa, N. Y., assignor to General Electric Company, a corporation of New York Application July 10, 1948, Serial No. 38,101

6 Claims. (Cl. 219—39)

My invention relates to an improved brooder or hover for raising chicks of poultry or wild fowl.

The object of my invention is to provide a novel, efficient, and inexpensive brooder of 350–500 chick capacity that is capable of maintaining a draft-free atmosphere of fresh warm air varying within a very few degrees of temperature over the whole floor area, the temperature of which brooder atmosphere can be varied accurately to meet the progressive temperature requirements of the brooding period.

The results obtained by existing brooders have revealed that during the first six weeks of the life of a brood of chicks, a varying percentage of chick loss could be expected averaging up to ten per cent. Tests of my invention have shown that the loss encountered by the use of my invention was in all cases less than three per cent, and in at least one case as low as one per cent.

Previous brooders, whether or not of the forced ventilation type, have areas within the brooder of unequal heat, causing the chicks to congregate to the most comfortable area. In such a scramble some are injured in the physical contact, while the weaker ones are unable to force their way through the press of crowding bodies to reach food or water and have been found dead in the middle of such an area with their crops nearly empty but otherwise unharmed. It has been found that the temperature in a brooder embodying my invention taken two inches from the floor varied a maximum of three degrees from center to curtain even with the brooder located in an unheated poultry house and sub-freezing atmospheric temperature.

Dampness in the brooder floor litter due to the breathing and voiding of the chicks encourages the development of mold, forming ideal incubating conditions for whatever disease germs may be present. The habitual picking of chicks at any moisture then communicates the disease through the brood.

In carrying out my invention, I provide a gradually sloping insulated roof with a central opening for admission of fresh air. The roof is supported upon adjustable legs so that it can be raised with the growth of the chicks. The roof and side curtains enclose a brooding chamber within which a current of air maintained at a predetermined temperature is gently circulated for ventilation. Except where the fresh air is drawn in from the roof a pressure is maintained in the brooder chamber greater than that of the atmosphere surrounding the chamber causing moisture laden air to be ejected at the sides and preventing drafts from entering the brooder chamber. Within the chamber drafts due to the forcing of air through a funnel or flue around a heat source as found in other brooders are eliminated in brooders embodying my invention by the use of a spiral heater covering a comparatively wide area and a relatively slow moving radial delivery fan for inducing circulation and maintaining the increased pressure within the chamber.

For a more complete understanding of my invention, reference is made to the drawing of one embodiment of my invention in which Fig. 1 is a vertical section of the brooder; Fig. 2 is an enlarged partially sectional view showing the arrangement of the thermostat; Fig. 3 is a partial plan view of the brooder shown in Fig. 1 with the top partially cut away; and Fig. 4 is a line diagram of the brooder electrical circuit.

Referring to the diagram, in one form of my invention the brooder comprises a double anticlinal roof made of substantially rigid flat sheet metal having equal slopes 1 of substantially two inches to the foot. The slopes are reinforced at their joining edges by the ribs 2. With a flat roof it was found that the circulated air did not travel to the brooder sides but left a ring of motionless air around the brooder sides. Also, the roof surface did not warm up appreciably. With the same fan and heater unit installed beneath a sloped roof the air current traverses the roof to the brooder sides before returning along the floor.

The scrubbing action of the stream of warm air directed at them forces the layer of dead air concomitant with the flat surfaces to move, applying heat to the surfaces, which heat is radiated downward to the backs of the chicks.

With such a low slope the brooder can be raised for inspection approximately to an angle of forty-five degrees without disturbing the roof litter. Adjustable legs 3 (adjustments not shown) support the roof at its four corners.

Walls 4 are extended above the roof to form a continuous, substantially vertical wall around the roof edge high enough to retain a covering 5 of three to four inches of litter over the top of the roof for insulation.

This method of insulating the roof was chosen because it is efficient and litter can be obtained in nearly every locality at little or no cost. Crushed corn cobs, crushed sugar cane stalks, peanut shells, chopped straw, and other similar materials have been used with excellent results. The efficiency of such insulation was demonstrated when two test stations separately reported power failures of several hours duration, during which the chickens remained unharmed in an unheated coop in sub-freezing weather, their bodily heat alone having been sufficient to keep the atmosphere of the brooder from falling to a dangerously low temperature.

Fabric curtains 7 of light flannel or similar material depend from the sides completely enclosing the brooder chamber but allowing free ingress and exit of chicks. A two inch diameter opening 6 in the roof communicates into a square pyramidal dome projecting above the roof substantially in the center of the brooder. One face of the dome has a disk cover 8 pivoted between two holes of different diameters, the smaller of the holes 9 furnishing enough ventilation during the earlier period of brooding to be changed to the larger opening 10 during the remainder of the brooding period.

Substantially in the center of the brooder and beneath the roof opening, a fan 11 is driven by an electric motor 11' with a substantially vertical rotation axis mounted upon a platform or support consisting of a perforated metal plate 12 horizontally suspended at its four corners in spaced relation from the roof surfaces. Also attached to the upper surface of the plate is an electric heater 13 extending spirally around the fan axis controlled by the adjustable thermostat 15 attached to the underside of a roof surface by a bracket and having an adjusting lever 15' projecting through the roof and above the level of the roof litter.

The fan is of particular design in order to cause the air heated by passing over the heated coil to be mixed with fresh air drawn in from the dome and to direct the mixture against the sloping roof and cause it to proceed down the underside of the roof with minimum turbulence in the air, which turbulence would result in currents normal to the direction of flow when the air arrived at the sides of the brooder. Such normal currents would draw in outside air and result in alternate pockets of warm and cold air being formed around the brooder sides.

The fan 11 is of novel design, having a flat, substantially S-shaped shroud 16 with identical reverse curve sections located 180 degrees apart about its center and two curved radially extending rectangular blades 17 and 18 firmly attached to the top surface of the shroud in edgewise relation therewith and on opposite ends of the shroud plate. The curve of each blade referred to the center of rotation is expressed substantially by the mathematical series 1, 1, 2, 3, 5, 8, 13, 21, etc. Around the blades the shroud projects forming the baffles 19 and 20. As pictured in Fig. 3, the fan rotates counterclockwise. The essentially cam action of this fan is to push air radially away from its sides rather than the action of the usual paddle type fan of taking in air at the center and delivering it in tangential streams from the blades. The shroud extends beyond the blades along their entire length forming baffles 19 and 20 to prevent the cold air being sucked down through the roof ventilator from crossing to the underside of the blade while the fan blades propel the cold air radially from the fan. A particle of air at 21 will be moved to position 22 as the fan blade 16 completes a one-half revolution counterclockwise. The velocity of the particle will then be twice the number of revolutions per second times the distance between point 21 and point 22.

The moving fan projects a stream of air from the periphery which joins the ascending heated air at 23 and the mixture moves down the inside surfaces of the roof.

From the roof, the mixture travels slowly down the curtains and back along the floor absorbing moisture from the litter and droppings as well as from the air exhaled by the chicks, rising in a column at the center aided by convection from the heater. Action of the fan causes the atmosphere of the brooder chamber to be under pressure slightly higher than that of the air surrounding the brooder except directly beneath the ventilator where the cold air enters. Because of the increase in brooder pressure, escape of air under the bottom of the side curtains is provided. Since the escaping air contains more moisture than the fresh air replacing it from the ventilator, the tendency of the cycle is eventually to expel all the moisture within the brooder. Tests have shown that floor litter even when completely saturated when laid down dried to less than 20 per cent dampness content within a very few days. In no other brooder known to this inventor is the floor litter drier at the end than at the beginning of a brood period.

The resulting mixture of moist air from the central column and the cold dry air from the dome is far from saturated, so there is no tendency of the air to deposit moisture as it traverses the warm roof surfaces and the curtains. In other brooders tested, it was found that moisture collected on the cloth curtains at which moisture the chicks continued to peck until the curtain was riddled with large holes even though heavy coarse cloth was used. Since the curtain in my brooder is always dry, there is no tendency of the chicks to peck at it and light weight curtains can be used. In addition, the use of such light weight curtains affords easy ingress and exit for the chicks.

An attraction light 24 is also mounted on the plate 12. Fig. 4 is a line diagram of the electric circuit, showing the fan motor 11' and the attraction light 24 permanently connected in parallel and the electric heater connected in parallel through the thermostat 15.

A hole (not shown) is drilled in the roof through which a thermometer may be inserted to determine the temperature inside the brooder while setting the thermostat.

In my brooder, there is no chance of damage to chicks through contact with a hot surface, since the heating element is mounted too high for them to reach.

In operation, the temperature at the beginning of the brooding period is set at near the hatching temperature of a chick and the heat supplied is gradually decreased to zero at the end of the usual six weeks' period. At the end of this period, if the brooder is left in the coop, the chickens generally return under its shelter at night to roost since the insulated roof reflects their bodily heat making the space beneath the brooder warmer than the rest of the coop.

What I claim as new and desire to secure by Letters Patent of the United States is:

1. A chick brooder comprising a gradually sloping roof, side walls extending above the roof edge to form a continuous wall around said roof edge for retaining a layer of litter heat insulation material on said roof, the slope of said roof being of such a low value that said insulation material is retained in position when said roof is tilted substantially 45 degrees for inspection, a support suspended in spaced relation with said roof, a heating unit mounted on said support and a radially acting fan mounted upon said support substantially centrally of said roof for producing a circulation of air over said heater and into contact with said underside of said roof, thereby to heat said roof so that heat is radiated downward from the said roof.

2. A chick brooder comprising a gradually sloping roof and side walls extended above the roof edge to form a continuous wall around said roof edge for retaining a layer of litter heat insulation material upon said roof, a substantially horizontal platform suspended beneath said roof, a radially acting fan adjacent said roof mounted with its rotation axis substantially vertical upon said platform substantially centrally of said brooder, a heating unit mounted upon said platform and extending around the axis of said fan, means for rotating said fan to produce circulation of air over said heater and into contact with the under surface of said roof whereby said surface is heated and radiates heat downward.

3. A chick brooder comprising a gradually sloping roof, side walls extending above the roof edge to form a continuous wall around said roof edge for retaining a layer of heat insulating material on said roof, legs supporting said roof, curtain walls of fabric material hanging from said edge of said roof to form with said roof a brooder enclosure, said roof being provided with a central ventilating opening, a support suspended from said roof below said opening, an electric heater on said support, a motor mounted on said support below said opening with its shaft substantially vertical, a fan provided with curved radially extending blades mounted above said heater driven by said motor for pushing cold air entering downward through said opening radially outward where said cold air mixes with heated air moving upward over said heater, said heated air mixture then moving outward in contact with the under surface of said roof to said curtain walls, whereby said roof is heated and radiates heat downward.

4. A chick brooder comprising a roof having a layer of heat insulating material on the upper surface thereof, legs supporting said roof, curtain walls of fabric material hanging from the edge of said roof to form with said roof a brooder enclosure, said roof being provided with a central ventilating opening, a support suspended from said roof below said opening, an electric heater on said support, a motor mounted on said support below said opening with its shaft substantially vertical, a fan mounted above said heater driven by said motor, said fan comprising a substantially horizontal shroud plate and curved radially extending blades mounted edgewise on the upper side of said shroud plate, said blades serving to push cold air entering downward through said opening radially outward from said shroud plates where said cold air mixes with heated air moving upward over said heater, said heated air mixture then moving outward in contact with the under surface of said roof to said curtain walls, whereby said roof is heated and radiates heat downward.

5. A chick brooder comprising a roof made of sheet metal forming a smooth under surface, side walls extending upward around the edge of said roof for retaining a layer of heat insulation material on the upper side of said roof, legs supporting said roof, curtain walls of fabric material hanging from the edge of said roof to form with said roof a brooder enclosure, said roof being provided with a central ventilating opening, a support suspended from said roof below said opening, an electric heater on said support, a motor mounted on said support below said opening with its shaft substantially vertical, a fan mounted above said heater on the shaft of said motor, said fan comprising a shroud plate and curved radially extending blades mounted edgewise on the upper side of said shroud plate, said blades serving to push cold air entering downward through said opening radially outward from said shroud plate where said cold air mixes with heated air moving upward over said heater, said heated air mixture then moving outward in contact with the under surface of said roof to said curtain walls, whereby said roof is heated and radiates heat downward, then down said curtain walls, back along the floor to the center of said roof and upward over said heater, whereby a substantially uniform air temperature is maintained over the floor of said brooder enclosure and air pressure is maintained in said enclosure to eject air under said curtain walls.

6. A chick brooder comprising a roof made of sheet metal forming a smooth under surface, a layer of heat insulation material on the upper side of said roof, legs supporting said roof, curtain walls of fabric material hanging from the edge of said roof to form with said roof a brooder enclosure, said roof being provided with a central ventilating opening, a support suspended from said roof below said opening, an electric heater on said support, a motor mounted on said support below said opening with its shaft substantially vertical, a fan mounted above said heater on the shaft of said motor, said fan comprising an S-shaped shroud plate and two curved radially extending blades mounted edgewise on the upper side of said shroud plate on opposite ends thereof and in spaced relation respectively with the ends of said shroud plate thereby to form baffles preventing cold air entering downward through said opening to the center of said shroud plate from moving downward to the under side of said shroud plate, said blades serving to push said cold air radially outward from the center of said shroud plate where said cold air mixes with heated air moving upward over said heater, said heated air then moving outward in contact with the under surface of said roof to said curtain walls, whereby said roof is heated and radiates heat downward, then down said curtain walls back along the floor to the center of said roof and upward over said heater, whereby a substantially uniform air temperature is maintained over the floor of said brooder enclosure and air pressure is maintained in said enclosure to eject air under said curtain walls.

JAMES H. OLIVER.

REFERENCES CITED

The following references are of record in the file of this patent:

UNITED STATES PATENTS

| Number | Name | Date |
|---|---|---|
| 1,450,589 | Graff et al. | Apr. 3, 1923 |
| 1,828,809 | Landis | Oct. 27, 1931 |
| 2,203,215 | Du Bois | June 4, 1940 |
| 2,281,776 | Lyon | May 5, 1942 |
| 2,302,860 | Hill et al. | Nov. 24, 1942 |